US010139625B2

(12) United States Patent
Cazalet et al.

(10) Patent No.: US 10,139,625 B2
(45) Date of Patent: Nov. 27, 2018

(54) SLIDING FRAME (71) Applicant: Google LLC, Mountain View, CA (US)

(72) Inventors: Peter Cazalet, Mountain View, CA (US); Joseph John Hebenstreit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/210,568

(22) Filed: Jul. 14, 2016

(65) Prior Publication Data

US 2016/0320618 A1 Nov. 3, 2016

Related U.S. Application Data (63) Continuation of application No. 13/432,751, filed on Mar. 28, 2012, now abandoned.

(51) Int. Cl.

| G02B 27/01 | (2006.01) |
|---|---|
| G02C 5/18 | (2006.01) |
| G02C 5/20 | (2006.01) |
| G02C 5/16 | (2006.01) |
| H04N 5/225 | (2006.01) |
| G03B 29/00 | (2006.01) |

(52) U.S. Cl.
CPC ....... *G02B 27/017* (2013.01); *G02B 27/0149* (2013.01); *G02B 27/0176* (2013.01); *G02C 5/16* (2013.01); *G02C 5/18* (2013.01); *G02C 5/20* (2013.01); *G03B 29/00* (2013.01); *H04N 5/2251* (2013.01); *G02B 2027/0138* (2013.01); *G02B 2027/0178* (2013.01)

(58) Field of Classification Search
CPC .............. G02B 27/017; G02B 27/0149; G02B 27/0176; G02B 2027/0138; G02B 2027/0161; G02B 2027/0152; G02B 2027/0154; G02B 2027/0156; G02B 2027/0169; G02C 5/14; G02C 5/16; G02C 5/18; G02C 5/20; G02C 5/143; G02C 5/146; G03B 29/00; H04N 5/2251
USPC ............... 351/60, 83–89, 111, 114, 117–123
See application file for complete search history.

(56) References Cited

U.S. PATENT DOCUMENTS

| 27,359 A | 3/1860 | Gordon et al. |
|---|---|---|
| 5,035,498 A | 7/1991 | Robert |
| 5,812,234 A | 9/1998 | Carswell |
| 6,843,562 B1 | 1/2005 | Ng |
| 7,545,927 B2 | 6/2009 | Chen |

(Continued)

FOREIGN PATENT DOCUMENTS

| CA | 2623461 | 8/2009 |
|---|---|---|
| CN | 101819334 | 9/2010 |
| CN | 202049296 | 11/2011 |

(Continued)

OTHER PUBLICATIONS

Chinese Patent Office, Office action dated Oct. 19, 2015, issued in connection with Chinese Application No. 201380021420.1, 23 pages.

(Continued)

*Primary Examiner* — Marin Pichler
(74) *Attorney, Agent, or Firm* — McDonnell Boehnen Hulbert & Berghoff LLP (57) ABSTRACT

A band or frame for wearing on a person's head, as for example eyewear, is provided with a frame that has an inner frame member that is slidable relative to an outer frame element for stiffness or sizing adjustment of the band.

20 Claims, 7 Drawing Sheets (56) References Cited

U.S. PATENT DOCUMENTS

2010/0253904 A1   10/2010  Jannard
2011/0213664 A1    9/2011  Osterhout

FOREIGN PATENT DOCUMENTS

| EP | 1130880 | 9/2001 |
|----|---------|--------|
| EP | 2214047 | 8/2010 |
| WO | 96/24315 A1 | 8/1996 |
| WO | 01/86342 A1 | 11/2001 |

OTHER PUBLICATIONS

European Patent Office, Supplementary European Search Report dated Oct. 29, 2015, issued in connection with European Application No. 13768914.7, pages.

International Search Report and Written Opinion for corresponding PCT application No. PCT/US2013/032807, dated Jun. 21, 2013.

SLIDING FRAME

CROSS REFERENCE TO RELATED APPLICATION

The present application claims priority to U.S. patent application Ser. No. 13/432,751, filed on Mar. 28, 2012 and entitled "Sliding Frame," which is hereby incorporated by reference in its entirety.

FIELD OF THE DISCLOSURE

The disclosure generally relates to a frame to be worn by a person, such as a headband-like device, and more particularly relates to a frame for eyewear, and even more particularly to a head-mountable display having a band that is provided with a sliding mechanism for varying the band's stiffness, as for sizing and fitting.

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, computing devices may be worn by a user as they go about various aspects of their everyday life. Such computing devices may be "wearable" computers. Wearable computers may sense a user's surrounding by, for example, determining a user's geographic location, using cameras and/or sensors to detect objects near to the user, using microphones and/or sensors to detect what a user is hearing, and using various other sensors to collect information about the environment surrounding the user. Further, wearable computers may use biosensors to detect the user's own physical state. The information collected by the wearable computer may then be analyzed in order to determine what information should be presented to the user.

A wearable computer may take the form of a head-mountable display (HMD) that is worn by the user. An HMD typically provides a heads-up display near the user's eyes. As such, HMDs may also be referred to as "near-eye" displays. HMDs may overlay computer-generated graphics (e.g., text, images, video, etc.) on the physical world being perceived by the user. An HMD may also include a camera that is associated with the HMD, as on the frame of a pair of glasses, goggles or the like.

Moreover, the camera need not be part of an overall wearable computer associated with the eyewear, but could be a camera built into what might otherwise be a fairly standard optical eyeglass frame. The camera may be a miniature digital camera that is incorporated in the eyeglass frame, thus eliminating the need to carry the camera. How to actuate the camera can be an important feature.

Fitting or sizing such an HMD in the form of eyewear is a consideration. Some device to yield a "one size fits all" kind of arrangement is desirable. More particularly, an ability to adjust the stiffness of the frame or band may be most desirable. For example, an individual may wish a tight fit for certain activities, or a more loose fit for others. So too, an HMD may be used by multiple people over time, requiring some ability to adjust from head to head.

It will be noted, however, that while the present disclosure has its origin in the foregoing environment of a kind of HMD, it is considered to have a much wider scope and application. That could be in any kind of eyewear, or a headband to serve other purposes beyond a frame or mount for an eye lens or eyeglasses.

SUMMARY

In accordance with aspects of this disclosure, there is provided a frame for wearing on a person's head. The frame preferably has two frame members which interfit in a sliding arrangement. This sliding arrangement yields a less stiff frame than if the frame members were fixedly joined, and also provides the ability to adjust the stiffness by relative movement of the frame members. In one aspect, the frame has an outer generally stiff, or even rigid frame member having formed thereon one of a channel or an element receivable in the channel. The outer frame member may preferably be u-shaped.

In this aspect, the frame also has an inner more flexible frame member having the other of the channel or element receivable in the channel formed thereon. The inner frame member may preferably be u-shaped.

The inner and outer members are joined together in a sliding engagement, with the element received in the channel. The flexible member is movable relative to the outer frame member to thereby adjust fitting of the frame on a person's head.

In another aspect of the present disclosure, the arrangement can be of an outer frame member which is less stiff or rigid than the inner frame member.

In an even further aspect, the two slidable frame members may be of a similar or same stiffness or rigidity. Most preferably, the two frame members may be adjusted relative to one another, and then locked or otherwise releasably fixed together in the desired stiffness or size.

In another aspect of the present disclosure, the adjustable band or frame having the foregoing slidable inner and outer members takes the form of eyewear, or headgear, adapted to be secured to a wearer's head. Such eyewear would preferably include an HMD. The frame is designed to be located just above a wearer's eye. A camera, such as a digital and/or video camera, may be mounted to the frame. There is a power source for the camera, as well as a storage device configured to store digital images taken by the camera. An actuator for operating the camera may be further provided on the frame. The eyewear may be further provided with a computer, transmitters, transceivers and projector(s), for instance, so as to yield an HMD for the user.

The disclosure is not limited to glasses, but is applicable to other eyewear, such as goggles, or other headgear, which present a similar framework on which HMD equipment may be incorporated. Nor is the disclosure limited to eyewear, and may serve as a mount for all manner of other conceivable head-worn apparatus, or simply as an adjustable headband for other headgear.

These and other aspects, advantages and features of the disclosure will be further understood upon consideration of the following detailed description of an embodiment of the disclosure, taken in conjunction with the drawings, in which:

DETAILED DESCRIPTION

The following detailed description describes various features and functions of the disclosure with reference to the accompanying Figures. In the Figures, similar symbols typically identify similar components, unless context dictates otherwise. The illustrative apparati described herein are not meant to be limiting. It will be readily understood that certain aspects of the disclosure can be arranged and combined in a wide variety of different configurations, all of which are contemplated herein.

In one aspect of the present disclosure, an HMD has a stiffness adjustment ability enabling a wearer (or multiple wearers) to adjust the fit and stiffness of the HMD as worn. This may be considered further as a "one-size-fits-all" design. The HMD includes a band, or frame, that is configured to preferably partially wrap around the user's head. In an embodiment particularly disclosed hereafter, the band includes a substantially rigid, or generally stiff, outer frame member and an inner member that is more flexible, at least in part, so as to be relatively bendable. For instance, the outer frame member may be metal and the inner frame member a flexible plastic, forming a liner to the metal frame member. "Rigid" and "stiff" are understood to be relative terms as used herein, to indicate that the outer frame member holds its shape to a greater extent than the inner frame member.

In the foregoing embodiment, the inner and outer frame members are joined, or connected, together in a manner so that the inner flexible frame member can move, as by sliding, relative to the outer frame member. The joinder may be by a dove-tail engagement between the frame members, with the outer frame member having a channel formed thereon and the inner frame member having the mating portion that fits within the channel in sliding engagement. The dove-tail portions could also be reversed on the frame members. "Dove-tail" is used expansively herein, to refer to any kind of enlarged bead-like element which fits within a corresponding channel in sliding relationship thereto.

In an embodiment, the inner frame member may be monolithic (one-piece). Alternatively, it may be provided in two parts which are slidable in the outer frame member. In the latter arrangement, two sliding mechanisms, one positioned near the left side of the user's head and the other positioned near the right side of the user's head, may be provided. Each sliding mechanism enables the respective flexible liner inner member to slide relative to the rigid outer frame member portion as the band is flexed outward or inward.

The disclosure also contemplates an embodiment where the inner frame member may be stiffer or more rigid than the outer frame member. Further still, an embodiment is contemplated where the frame members may be similar or the same in relative rigidity or flexibility. It is the ability to slide relative to one another, in contrast to a bonded or constrained frame, that enables the desired stiffness adjustment.

The sliding mechanism(s) can reduce a stiffness of the band (frame), and can thereby allow the "one-size-fits-all" HMD design to accommodate different degrees of stiffness, which can further accommodate heads of different sizes and shapes.

In another aspect, the wearable sliding frame device could be provided with one or more locking mechanisms for selectively locking the corresponding sliding parts. Each locking mechanism could be, for example, a pin, a ratcheting mechanism, or an adjustable clamp, among others types of locking mechanisms. A user could switch the locking mechanism(s) to a locked position to lock the sliding parts, and thereby increase a stiffness of the band. For example, a user may prefer the HMD to have a stiff fit while the user is riding a bike. The user could switch the locking mechanism to an unlocked position to thereby reduce the stiffness of the band. For example, the user may prefer to loosen the fit of the HMD after the user is finished riding the bike.

In another related aspect of the disclosure, the inner and outer frame members may be selectively engaged or disengaged. For example, the user may couple or decouple the inner frame member (liner) from the frame to appreciably change the stiffness. The force settings do not need to be binary, and it is contemplated that the inner and outer frame members may be joined in a manner to provide several discrete or even continuously adjustable (analog) positions possible, as between full-soft and full-stiff. This could be analogous to the type of mechanism used in a zip-tie or squeeze clamp device. A user could effectively change both the pre-load condition and overall stiffness behavior of the frame by locking the frame relative to the liner in various positions.

It will be further understood that the effective starting or opening (relaxed-state) size of the frame may be adjusted by initially locking the inner or interior frame member to the outer or exterior frame member in a particular starting position. By way of example: if a user stretches the unlocked (freely slidable) frame members open by some amount, and then clamps or otherwise locks (fixes) the members together, the frame members may no longer return to their original relaxed-state starting positions. The effective new state would exhibit a larger tip-to-tip (along the open side of the u-shaped frame) opening dimension than previously exhibited in the unlocked state. Thus, the frame may be able to more comfortably be donned by a user with larger head. If one considers the frame analogous to a spring, the combined frame from this particular example would exhibit a higher spring force at its new starting position (a higher pre-load) than the previously unconstrained frame members exhibited in their original relaxed-state starting positions.

In like manner, if a user compresses the unlocked frame members together by some amount and then clamps or locks the members together, the effective new state would exhibit a smaller tip-to-tip frame opening dimension than in its previous (unlocked) state. Thus, the frame may be able to now effectively grip the head of a user with a head diameter smaller than the previously larger frame opening would have enabled.

Figure 1:
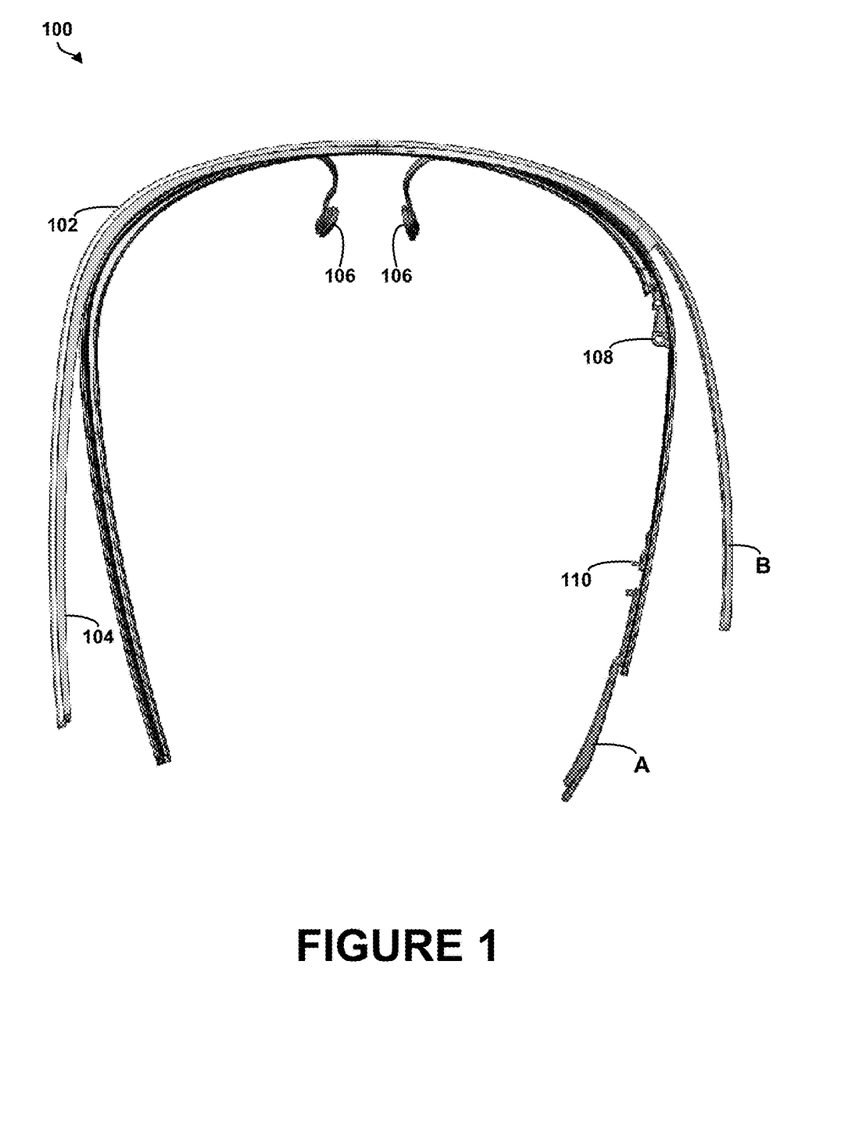
FIG. 1 is a top plan view of a band or frame that may serve as a mount for headworn devices or apparati, such as may be provided on a pair of optical glasses, shown in a first state of flex as well as a second state of flex.

Turning now to FIG. 1, a wearable frame or band 100 (these terms are used interchangeably herein) is shown, which in this embodiment is intended as a frame for a pair of glasses (eyewear), particularly for use as a mount for an HMD. However, and as previously noted, the disclosure has broader application to other eyewear, such as goggles, other headgear and the like, as well as beyond eyewear.

Band 100 has an outer frame member 102 and an inner frame member 104. The outer frame member 102 in this particular and preferred embodiment is metal, and generally rigid. The inner frame member 104 is made of a more flexible material, and in this particular embodiment is a plastic material. It has some rigidity, but is intended to be bendable. The inner frame member 104 may be considered as a liner to the outer frame member. Inner frame member 104 may therefore be referenced as a liner herein.

Nose-pieces 106 are conventional, and are shown here as part of the liner 104. Also provided on the liner 104 are mounting elements 108, 110 which may be used to affix devices for use in an HMD.

Figure 2:
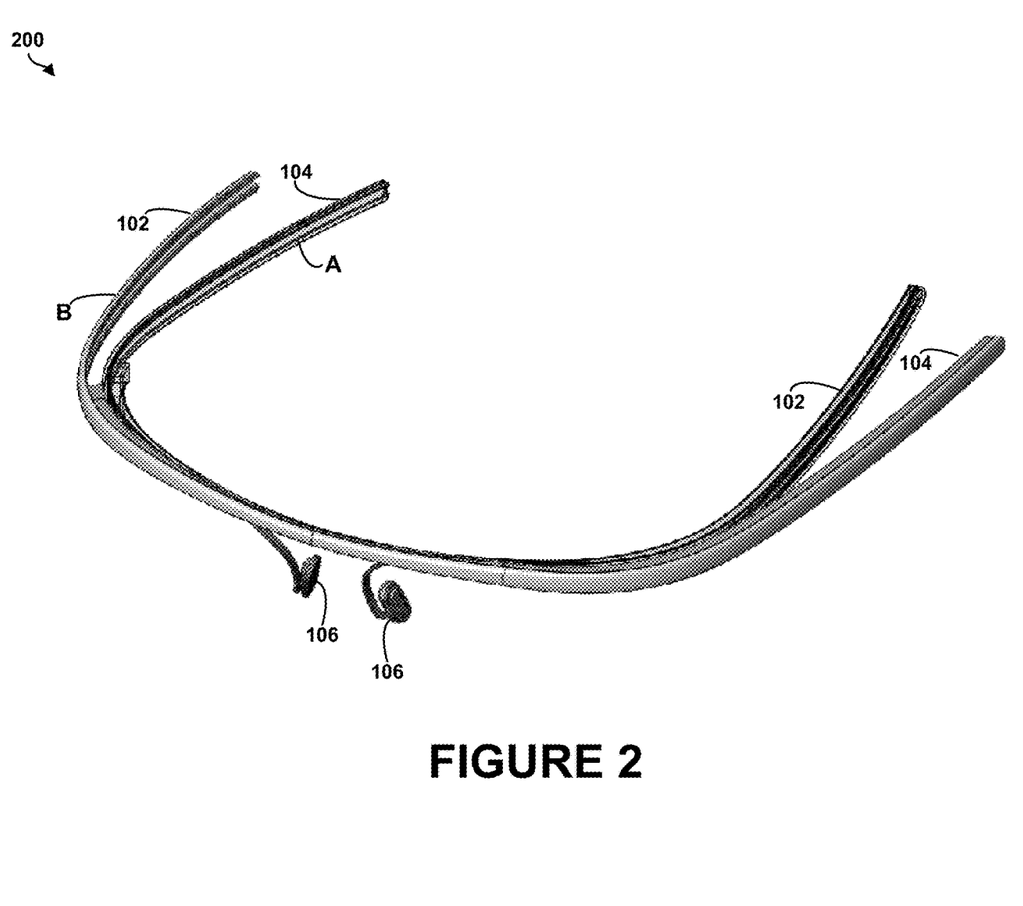
FIG. 2 is a perspective view of the band of FIG. 1, again in two different states of flex.

Note that FIG. 1 (and FIG. 2) shows the band in two separate positions. One position A is with the band flexed inboard relative to a wearer's head (front being where the nose-pieces are located). This would be, for example, in an unworn or "relaxed" state. The position indicated as B is the band flexed outboard relative to a wearer's head, which, for example, could be an as-worn position.

Figure 3:
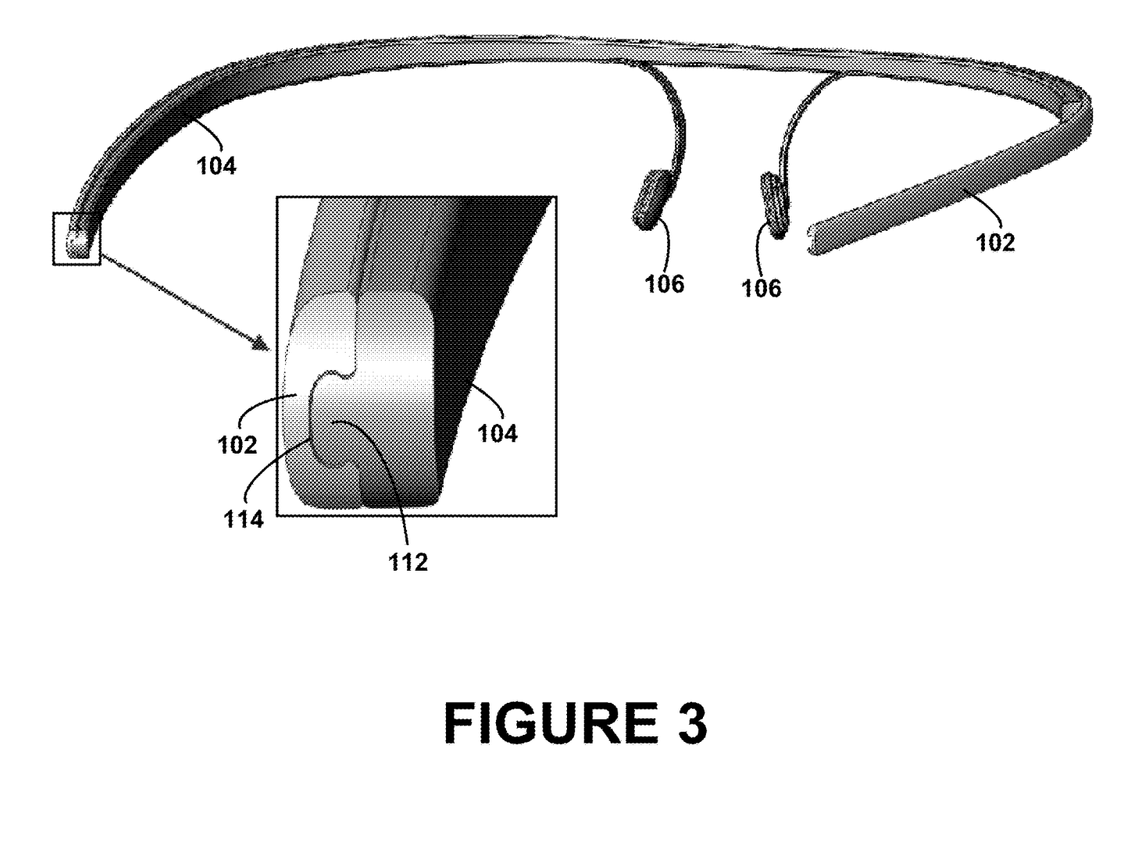
FIG. 3 is a generally front view of the band of FIG. 1, here shown with an inset of the joinder between the inner and outer frame members.
Figure 4:
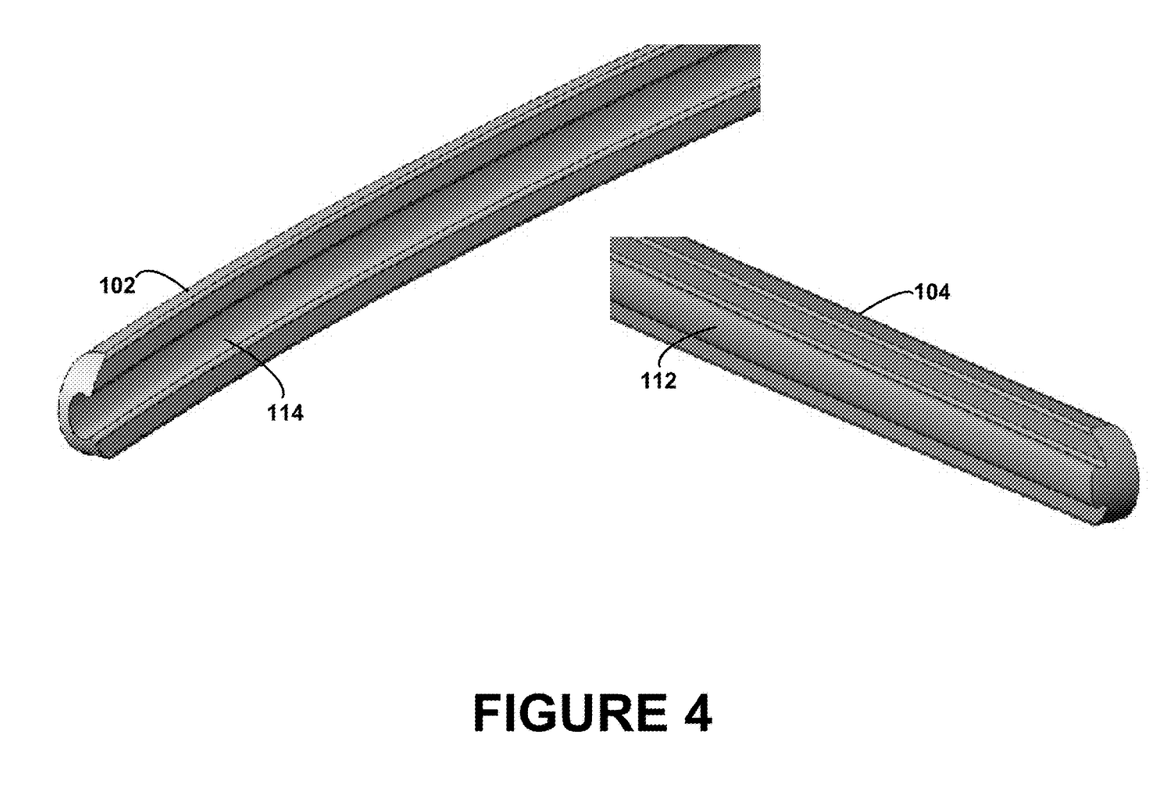
FIG. 4 is an enlarged view of portions of the inner and outer frame members detailing the engagement structures.

The inner and outer frame members 102, 104 are shown engaged through the use of a dove-tail arrangement. This is best illustrated in FIG. 3. Liner 104 has formed thereon the male part 112 of the dovetail, sometimes referred to as the "pin." Male part 112 fits within a complementary channel 114 formed within the inboard side of the outer frame member. This is sometimes referred to as a full-blind sliding dovetail, or French dovetail. Note that the two parts 112, 114 could just as well be reversed in terms of which member they are formed upon. Further, while the liner 104 is shown in this embodiment as a single piece, it could be two or more pieces. The pin or male part also need not be continuous. Likewise, the channel need not be continuous along a frame member. Moreover, other sliding engagements between the inner and outer members can be readily adapted for use in the band. The inner liner could be adapted to ride upon the exterior of the outer frame, for example.

In use, as the user flexes the band laterally outwardly, the liner 104 slides within the outer frame member 102. This allows the user to effectively reduce the normal force to the head, as compared to a one-piece frame.

Figure 5A:
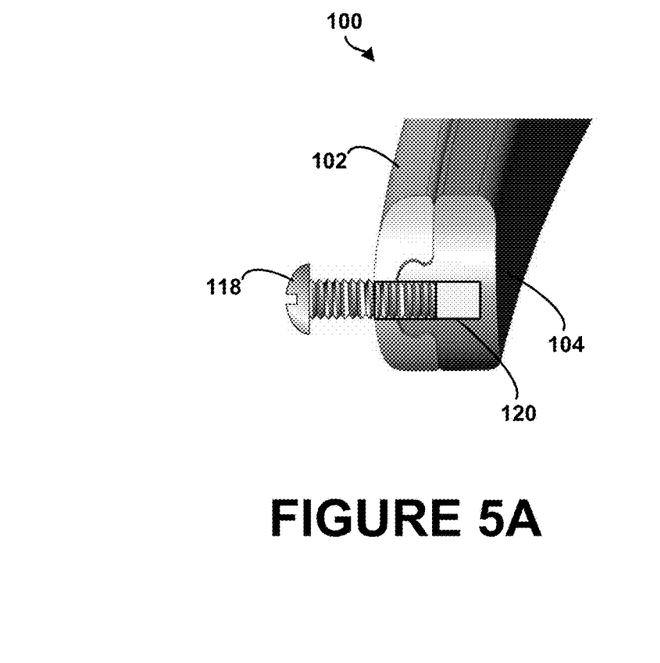
FIG. 5a is an enlarged portion of a side of the band of FIG. 1, with a fixation device.

FIG. 5a illustrates a version in which the two frame members may be fixed relatively to one another, after adjustment has occurred. Here, a set screw 118 is received within a threaded bore 120, with the bore formed in the outer frame member 102 generally normal to the liner 104. The set screw 118 is adapted to be turned by using a person's fingers, so as to engage the outboard side of the liner 104 and thereby frictionally fix the two frame members in place.

Figure 5B:
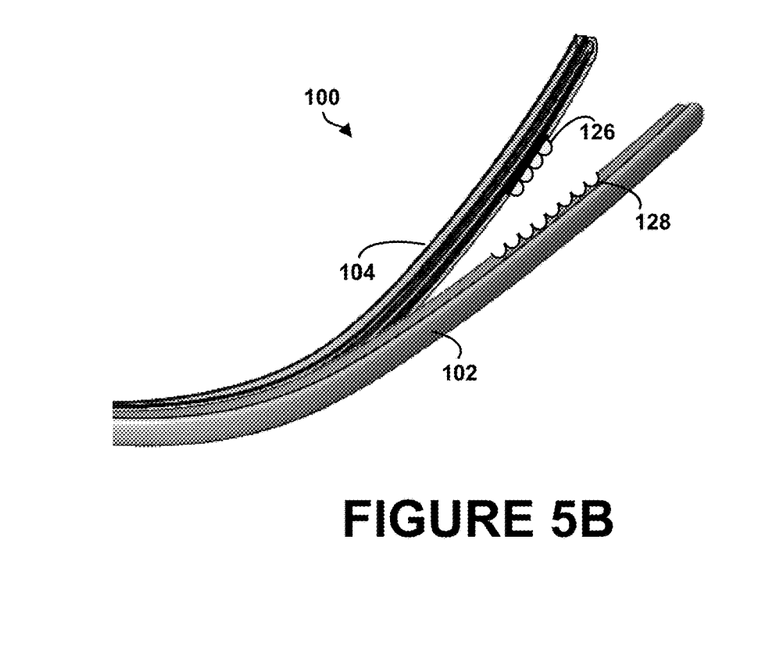
FIG. 5b is an enlarged portion of a side of the band of FIG. 1, with another fixation device, with part broken away to show the fixation mechanism.

Other mechanisms can be envisioned for holding the inner and outer frame members in position when desired, such as (FIG. 5b) a ratcheting arrangement (a bump(s) or a ridge(s) 126 formed on one of the frame members, here the inner frame member 104, which engage with complementary depressions or the like 128 formed on the other of the frame members, here the outer frame member).

The band of this disclosure may be implemented in, for example, a system for receiving, transmitting, and displaying data. The system may be in the form of a wearable computing device, or HMD. That may be eyeglasses 200, as illustrated in FIG. 6, as an example of a wearable computing device, but other types of wearable computing devices could additionally or alternatively be used, such as goggles.

Figure 6:
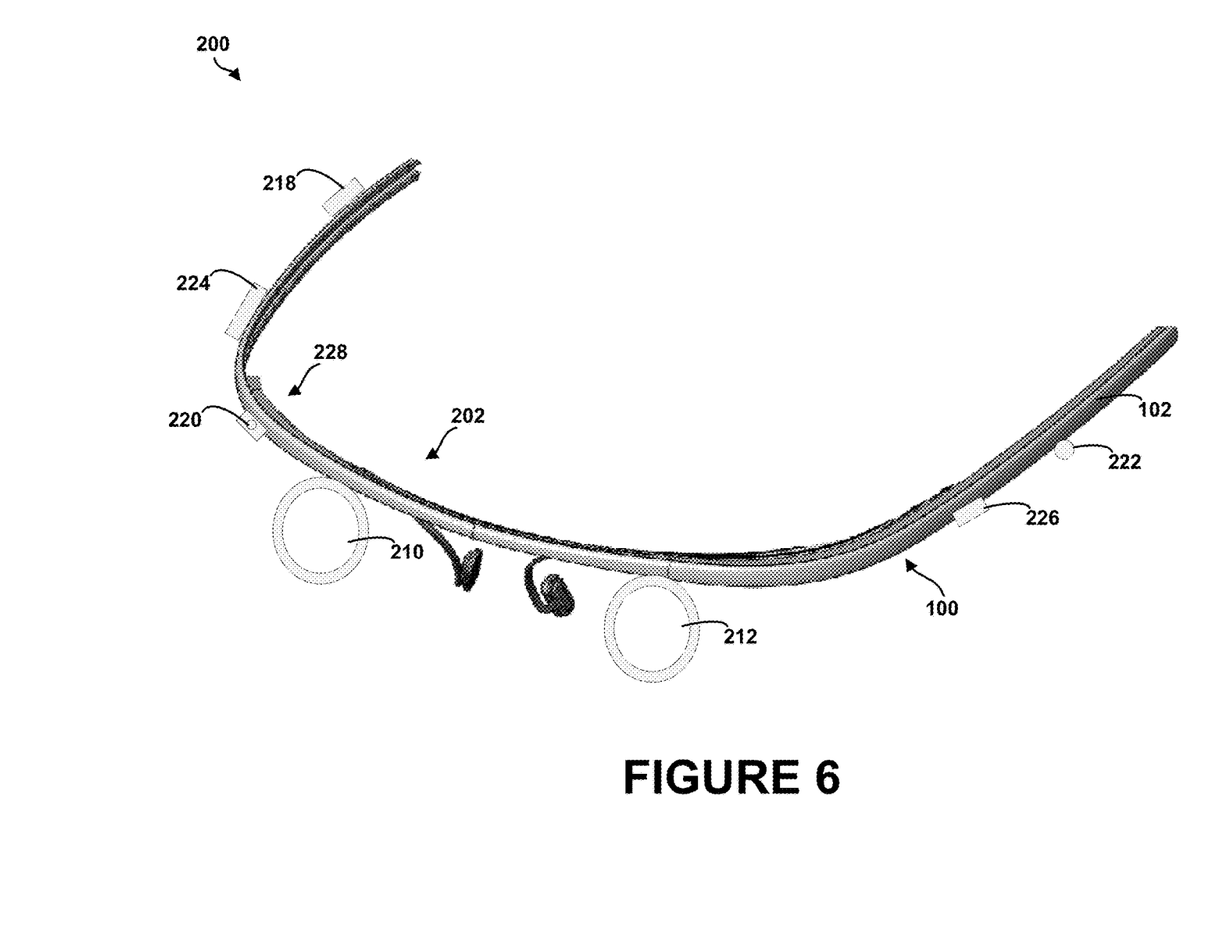
FIG. 6 is an embodiment made in accordance with the disclosure as eyewear for an HMD.

Turning now to FIG. 6, the eyeglasses 202 have lens elements 210 and 212. Each of the lens elements 210 and 212 may be formed of any material that can suitably display a projected image or graphic. Each of the lens elements 210 and 212 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The system 200 may also include an on-board computing system 218, a video camera 220, a sensor 222, and finger-operable touch pads 224, 226. The on-board computing system 218 is shown to be positioned on the extending sides of the band 100; however, the on-board computing system 218 may be provided on other parts of the eyeglasses 202 or even remote from the glasses (e.g., computing system 218 could be connected wirelessly or wired to eyeglasses 202). The on-board computing system 218 may include a processor and memory, for example. The on-board computing system 218 may be configured to receive and analyze data from the video camera 220 and the finger-operable touch pads 224, 226 (and possibly from other sensory devices, user interfaces, or both) and generate images for output from the lens elements 210 and 212.

The video camera 220 may be configured to capture images at various resolutions or at different frame rates. Many video cameras with a small form-factor, such as those used in cell phones or webcams, for example, may be incorporated into an example of the system 200. Although FIG. 6 illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 220 may then be used to generate an augmented reality where computer generated images appear to interact with the real-world view perceived by the user.

The sensor 222 is shown mounted on the side of the eyeglasses 202; however, the sensor 222 may be provided on other parts of the eyeglasses 202. The sensor 222 may include one or more of a gyroscope or an accelerometer, for example. Other sensing devices may be included within the sensor 222 or other sensing functions may be performed by the sensor 222.

The finger-operable touch pads 224, 226 are shown mounted on the extending sides of the eyeglasses 202. Each of finger-operable touch pads 224, 226 may be used by a user to input commands. The finger-operable touch pads 224, 226 may sense at least one of a position and a movement of a finger via capacitive sensing, resistance sensing, or a surface acoustic wave process, among other possibilities. The finger-operable touch pads 224, 226 may be capable of sensing finger movement in a direction parallel or planar to the pad surface, in a direction normal to the pad surface, or both, and may also be capable of sensing a level of pressure applied. The finger-operable touch pads 224, 226 may be formed of one or more translucent or transparent insulating layers and one or more translucent or transparent conducting layers. Edges of the finger-operable touch pads 224, 226 may be formed to have a raised, indented, or roughened surface, so as to provide tactile feedback to a user when the user's finger reaches the edge of the finger-operable touch pads 224, 226. Each of the finger-operable touch pads 224, 226 may be operated independently, and may provide a different function.

The eyeglasses 202 may include a first projector 228 coupled to an inside surface of the extending side of the band 100, and configured to project a display onto an inside surface of the lens element 210. Additionally or alternatively, a second projector may be coupled to an inside surface of the other side of the band 100, to project a display onto an inside surface of the lens element 212.

The lens elements 210 and 212 may act as a combiner in a light projection system and may include a coating that reflects the light projected onto them from a projector 228. In some embodiments, a special coating may not be used (e.g., when the projector 228 is a scanning laser device).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in-focus near-to-eye image to the user. A corresponding display driver may be disposed within the frame 100 for driving such a matrix display. Alternatively or additionally, a laser or LED source and scanning system could be used to draw a raster display directly onto the retina of one or more of the user's eyes. Other possibilities exist as well.

Figure 7:
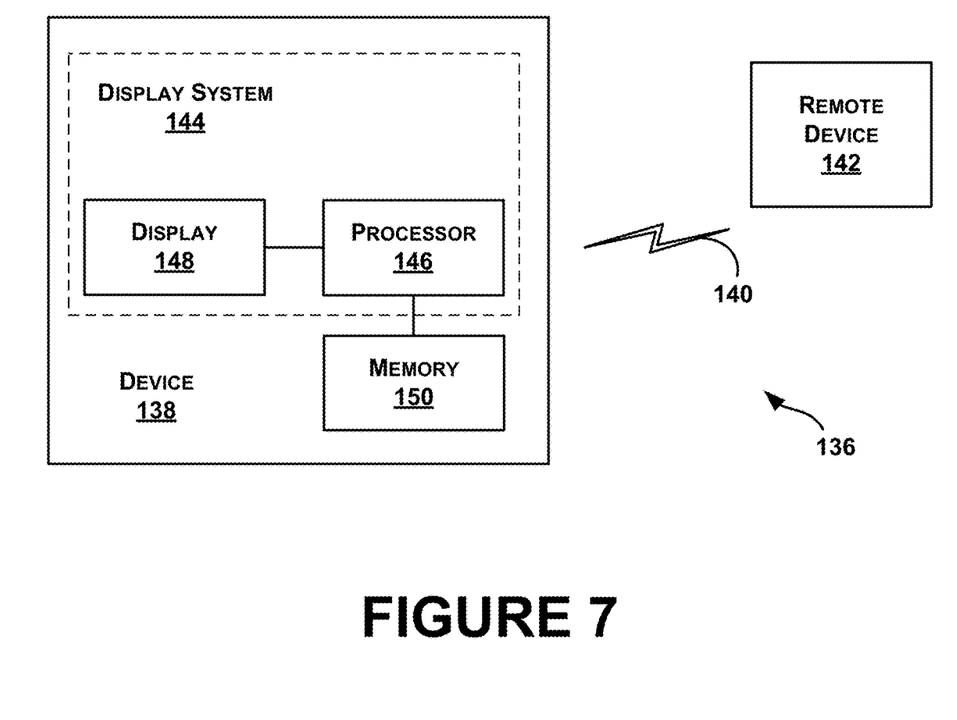
FIG. 7 is a schematic of a system for the HMD of FIG. 6.

FIG. 7 illustrates an example schematic drawing of a computer network infrastructure. In one system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 202.

Thus, the device 138 may include a display system 144 having a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a micro-processor or a digital signal processor, for example.

The device 138 may further include on-board data storage, such as memory 150 coupled to the processor 146. The memory 150 may store software that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 7, the communication link 140 is illustrated as a wireless connection; however, wired connections may also be used. For example, the communication link 140 may be a wired link via a serial bus such as a universal serial bus or a parallel bus. A wired connection may be a proprietary connection as well. The communication link 140 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 142 may be accessible via the Internet and may be a computing cluster associated with a particular web service (e.g., social-networking, photo sharing, address book, etc.).

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A head-wearable frame, comprising:
   an outer u-shaped frame member of a first stiffness having formed thereon one of a channel or an element receivable in said channel, the outer u-shaped frame member having a first outer-member tip-to-tip opening dimension;
   an inner flexible u-shaped frame member with a second stiffness different than that of said first stiffness, having the other of said channel or element receivable in said channel formed thereon, the inner flexible u-shaped frame member having a first inner-member tip-to-tip opening dimension;
   said inner and outer frame members being joined together in a sliding engagement with said element received in said channel, said inner flexible u-shaped frame member being movable relative to said outer u-shaped frame member to adjust stiffness of the head-wearable frame; and
   a single fixation device operable for a singular fixation action that engages both (a) the outer u-shaped frame member in an adjusted position in which the outer u-shaped frame member has a second outer-member tip-to-tip opening dimension that is different from the first outer-member tip-to-tip opening dimension, and (b) the inner flexible u-shaped frame member in an adjusted position in which the inner flexible u-shaped frame member has a second inner-member tip-to-tip opening dimension that is different from the first inner-member tip-to-tip opening dimension.

2. The head-wearable frame of claim 1, wherein said channel and element are a dovetail arrangement.

3. Eyewear, comprising:
   a frame adapted to be secured to a wearer's head;
   an outer substantially rigid curved frame member having formed thereon one of a channel or an element receivable in said channel, the outer substantially rigid curved frame member having a first outer-member tip-to-tip opening dimension;
   an inner flexible curved frame member having the other of said channel or element receivable in said channel formed thereon, the inner flexible curved frame member having a first inner-member tip-to-tip opening dimension;
   said inner and outer frame members being joined together in a sliding engagement with said element received in said channel, said inner flexible curved frame member being movable relative to said outer substantially rigid curved frame member to adjust fitting of the frame;
   a single fixation device operable for a singular fixation action that engages both (a) the outer substantially rigid curved frame member in an adjusted position in which the outer substantially rigid curved frame member has a second outer-member tip-to-tip opening dimension that is different from the first outer-member tip-to-tip opening dimension, and (b) the inner flexible curved frame member in an adjusted position in which the inner flexible curved frame member has a second inner-member tip-to-tip opening dimension that is different from the first inner-member tip-to-tip opening dimension; and at least one lens element mounted to said frame.

4. The eyewear of claim 3, further comprising:
a camera mounted to said frame;
a power source for said camera; and
a storage device configured to store digital images taken by said camera.

5. The eyewear of claim 4, further comprising:
a computing system carried by said frame, said computing system comprising said storage device.

6. The eyewear of claim 3, further comprising:
a video projector mounted to said frame and configured to project images upon the inside of one or more of the at least one lens element mounted to said frame.

7. The eyewear of claim 3, wherein said channel and element are a dovetail arrangement.

8. A head-wearable frame, comprising:
an outer frame member, the outer frame member having a first outer-member tip-to-tip opening dimension;
an inner frame member, the inner frame member having a first inner-member tip-to-tip opening dimension;
said inner and outer frame members being joined together with a mechanism that engages said inner and outer frame members in a sliding engagement to thereby adjust stiffness of the head-wearable frame; and
a single fixation device operable for a singular fixation action that engages both (a) the outer frame member in an adjusted position in which the outer frame member has a second outer-member tip-to-tip opening dimension that is different from the first outer-member tip-to-tip opening dimension, and (b) the inner frame member in an adjusted position in which the inner frame member has a second inner-member tip-to-tip opening dimension that is different from the first inner-member tip-to-tip opening dimension.

9. The head-wearable frame of claim 8, wherein said inner and outer frame members are each of the same stiffness.

10. The head-wearable frame of claim 8, wherein said inner and outer frame members are of different stiffness relative to each other.

11. The head-wearable frame of claim 8, wherein said outer frame member has formed thereon one of a channel or an element receivable in said channel, and the other of said channel or element receivable in said channel is formed on said inner frame member, with said element received in said channel to join said inner and outer frame members.

12. The head-wearable frame of claim 11, wherein said channel and element are a dovetail arrangement.

13. The head-wearable frame of claim 8, wherein said outer frame member comprises an outer rigid u-shaped frame member having formed thereon an elongated channel along an inboard side, and said inner frame member comprises an inner flexible u-shaped frame member having an elongated element formed on an outboard side receivable in said channel, said inner and outer frame members being joined together in a sliding engagement with said elongated element received in said elongated channel, said inner flexible u-shaped frame member being movable relative to said outer rigid u-shaped frame member to thereby adjust fitting of the head-wearable frame on a person's head.

14. The head-wearable frame of claim 8, further comprising:
at least one lens element mounted to said head-wearable frame.

15. The head-wearable frame of claim 14, further comprising:
a video projector mounted to said head-wearable frame and configured to project images upon the inside of one or more of the at least one lens element mounted to said head-wearable frame.

16. The head-wearable frame of claim 8, further comprising:
a camera mounted to said head-wearable frame;
a power source for said camera; and
a storage device configured to store digital images taken by said camera.

17. The head-wearable frame of claim 16, further comprising:
a computing system carried by said head-wearable frame, said computing system comprising said storage device.

18. A head-wearable frame, comprising:
an outer frame member, the outer frame member having a first outer-member tip-to-tip opening dimension;
an inner frame member, the inner frame member having a first inner-member tip-to-tip opening dimension;
a mechanism joining said inner and outer frame members in a sliding engagement; and
a single fixation device operable for a singular fixation action that engages both (a) the outer frame member in an adjusted position in which the outer frame member has a second outer-member tip-to-tip opening dimension that is different from the first outer-member tip-to-tip opening dimension, and (b) the inner frame member in an adjusted position in which the inner frame member has a second inner-member tip-to-tip opening dimension that is different from the first inner-member tip-to-tip opening dimension.

19. The head-wearable frame of claim 18, wherein said inner and outer frame members are made so as to be of different stiffness relative to each other, thereby providing an ability to adjust a stiffness or size of the head-wearable frame.

20. The head-wearable frame of claim 18, wherein said inner and outer frame members are made so as to be of the same stiffness relative to each other, thereby providing an ability to adjust a stiffness or size of the head-wearable frame.

* * * * *